United States Patent
Xu (10) Patent No.: US 10,521,263 B2
(45) Date of Patent: Dec. 31, 2019

(54) GENERIC COMMUNICATION ARCHITECTURE FOR CLOUD MICROSERVICE INFRASTRUCTURE

(71) Applicant: SAP SE, Walldorf (DE)

(72) Inventor: Fenglei Xu, Shanghai (CN)

(73) Assignee: SAP SE, Walldorf (DE)

( * ) Notice: Subject to any disclaimer, the term of this patent is extended or adjusted under 35 U.S.C. 154(b) by 111 days.

(21) Appl. No.: 15/836,043

(22) Filed: Dec. 8, 2017

(65) Prior Publication Data
US 2019/0179663 A1 Jun. 13, 2019

(51) Int. Cl.
| | |
|---|---|
| *G06F 9/54* | (2006.01) |
| *G06F 9/48* | (2006.01) |
| *G06F 9/50* | (2006.01) |
| *G06F 3/06* | (2006.01) |
| *H04L 29/08* | (2006.01) |

(52) U.S. Cl.
CPC ............ *G06F 9/4806* (2013.01); *G06F 3/067* (2013.01); *G06F 9/5072* (2013.01); *G06F 9/54* (2013.01); *G06F 9/547* (2013.01); *H04L 67/10* (2013.01)

(58) Field of Classification Search
CPC ...... G06F 9/4806; G06F 3/067; G06F 9/5072; G06F 9/54; H04L 67/10
USPC ........................................................ 709/201
See application file for complete search history.

(56) References Cited

U.S. PATENT DOCUMENTS

| | | | |
|---|---|---|---|
| 2016/0112521 A1* | 4/2016 | Lawson | .................. H04L 67/16 709/227 |
| 2017/0279654 A1* | 9/2017 | Kinoshita | ............. G06F 9/5005 |

* cited by examiner

*Primary Examiner* — Glenford J Madamba
(74) *Attorney, Agent, or Firm* — Buckley, Maschoff & Talwalkar LLC (57) ABSTRACT

A dispatcher layer is instantiated to include dispatcher correspondingly associated with microservices part of an application. The communication between the microservices may be performed based on different communication methods, such as API calling methods, event-publishing methods, combination thereof, other. Communication statistical data is stored in relation to performed interactions between the microservices while the application is running and serving requests sent by users. The communication statistical data is evaluated based on predefined communication conditions related to determining a communication method for interaction between services from the set. Based on the evaluation, instructions to a first dispatcher at the dispatcher layer for configuring the determined communication method between the first service and the second service is provided. The first dispatcher is coupled to the first service and the first dispatcher configures the communication method based on request exchange with a second dispatcher associated with the second service.

20 Claims, 5 Drawing Sheets

GENERIC COMMUNICATION ARCHITECTURE FOR CLOUD MICROSERVICE INFRASTRUCTURE

BACKGROUND

A software system may contain any type of application business logic and may be recursively divided into multiple microservices. The division of the business implemented logic may be performed regardless of the manner how the split of logic is performed. The logic may be split into microservices that communicate with each other during execution of the application business logic and serving client requests. The communication between the microservices may be performed through application programming interface (API) calling methods at any applicable granular levels as a communication between the split-up services. Additionally, communication between the microservices may be handled through event publishing as an alternative communication.

The micro applications may be organized in complex distributed architectures, where dozens of dependencies between the services exist. If one microservice becomes latent during a user request, then the entire user request can be blocked. It can also cause resources to become saturated in seconds and can result in cascading failures.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with their advantages, may be best understood from the following detailed description taken in conjunction with the accompanying drawings.

DETAILED DESCRIPTION

Embodiments of techniques for arranging communication between microservices at a cloud application are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

The logic of a cloud application may be split into microservices that communicate with each other during execution of the application business logic and serving client requests. Microservice architectures can choose freely between event publishing, external API calling and a combination thereof.

There may be adopted a free combination of event publishing and external application programming interface (API) calling at any applicable granular levels as a communication methods between the newly split-up services. It can be proved, for the aforementioned freely chosen combination of communication methods, at least one concrete design is present to make the resulted system behaves the same way as before.

In one embodiment, a system split-up into microservices, where a set of services utilize event-publishing as the communication method and the rest of the services utilize API calling, can designed. API calls can be achieved by event-publishing methods. The dependencies between microservices may be associated with requests for different types of data and different effect on the receiving party. For static state dependencies (such as in relation to requests for database (DB) data) between services, event-publishing may be selected as a communication method as a requesting party can fetch relevant data by listening to state change broadcasts sent by requested (receiving) parties. For dynamically generated data (such as real-time calculated data, encryption requests, etc.), a pair of published events with opposite directions can achieve a data request as a substitute to API call. The communication through event-publishing may be implemented through an event handling layer, such as an event hub. A published event may be interpreted as an API call without a response. The two concepts of communication handling—API calling and event publishing, may be defined interchangeably in communication terms of a cloud application.

Figure 1:
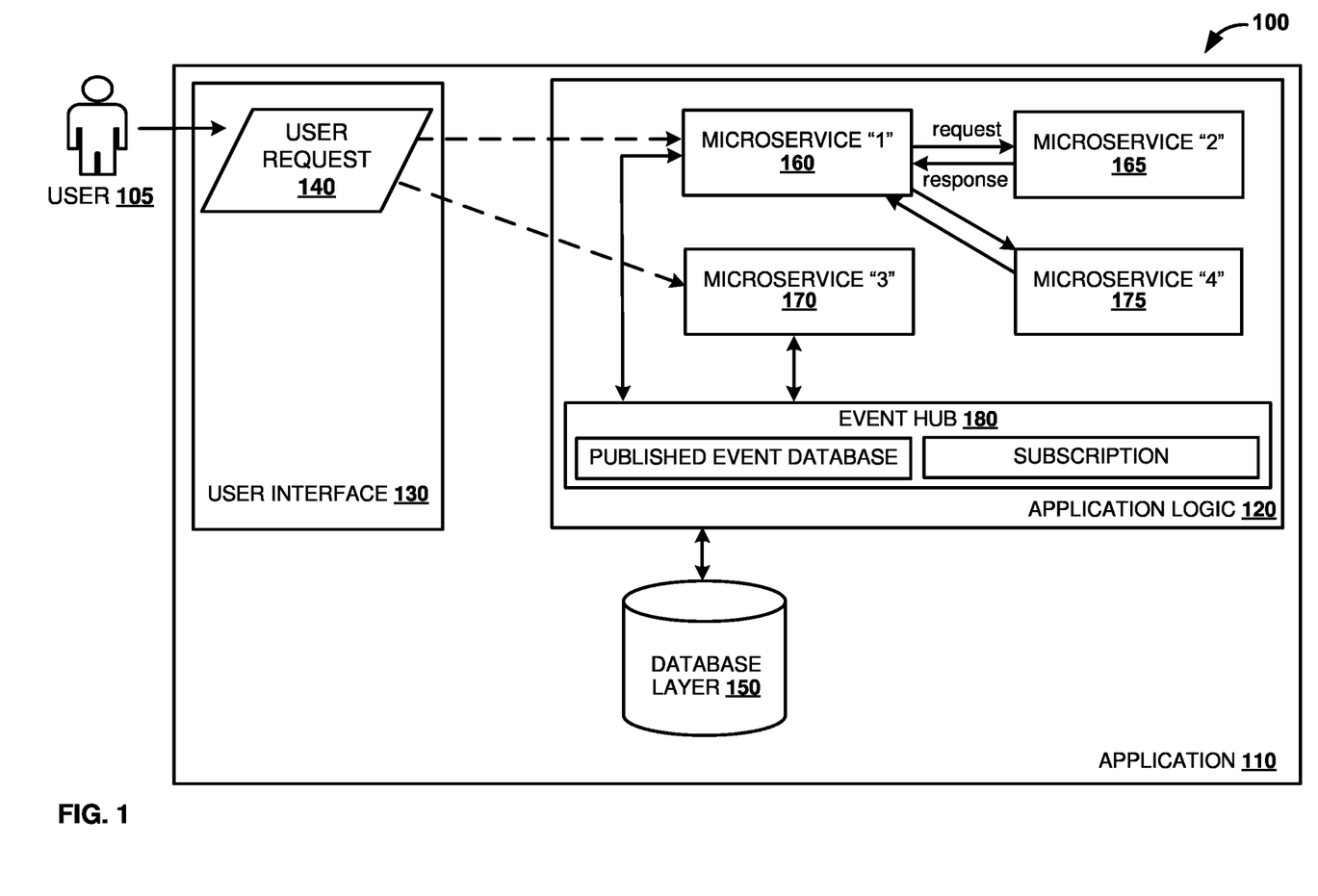
FIG. 1 is a block diagram illustrating an exemplary system for handling communication between microservices part of an application, according to one embodiment.

FIG. 1 is a block diagram illustrating an exemplary system 100 for handling communication between microservices part of an application, according to one embodiment. An application 110 is provided that includes application logic 120, user interface 130, and database layer 150.

The application's logic 120 is divided into microservices. The application logic 120 may be split into microservices that communicate with each other during execution of the application logic and serving client requests. Different communication dependencies between the microservices may be defined based on defined functionality at the application logic 120 for the application 110.

A system split-up into microservices using event-publishing as the communication method can be designed. This is because that for static state dependencies (such as database (DB) data) on other services, event-publishing can fetch relevant data by listening to state change broadcasts sent by others. As for dynamically generated data (such as real-time calculation, encryption requests, etc.), a pair of published events with opposite directions can achieve the data request as a disguised API call. API calls can be achieved by event-publishing methods. A published event may be interpreted as an API call without a response. The architecture for communication between microservices is defined based on a set of configured communication rules.

Determination of communication rules between different microservices at the application logic 120 may be based on types of request, associated data, and on statistical evaluation of historic data related to executed communication between the services.

Communication statistical data associated with exchange of requests between microservices may be stored and analyzed to enhance defined and configures routes for communication between microservices at the application logic 120. The communication statistical data may be associated with request frequency, receiving side availability, cache data footprint, other. The communication statistical data may be stored at the database layer 150, for example at a log data storage.

In one embodiment, based on the analysis over the communication statistical data, a different approach for handling communication between different sets of services and different types of requests may be selected. The analysis may be performed in relation to a number of predefined conditions, which are used to evaluate the stored communication statistical data. For example, an expected level of responsiveness may be associated with the microservice. Delays in responses between microservices may lead to low performance and low responsiveness for the application 110. Further, the cache data footprint associated with a service may be monitored to meet a predefined qualifying condition criteria. If the rules defined are not met by a microservice, then requests to the API instantiated by the service may be automatically replaced by event listening methods.

In one embodiment, requests between microservices may be executed through sending Hypertext Transfer Protocol (HTTP) requests from one microservice to a provide API at a receiving microservice. The most-commonly-used HTTP method are POST, GET, PUT, PATCH, and DELETE. These methods correspond respectively to create, read, update, and delete (or CRUD) operations. There may be other types of method requests between services, such as OPTIONS and HEAD. Different types of requests between microservices at the application logic 120 may be associated with state data or with dynamically generated data. Further, the requests may be associated with the predefined condition criteria and associated communication rules.

For example, dynamic data can be characterized with that it may be acquired through providing a series of input parameters linked to a specific need only known to the caller side (requesting microservice). For example, requests associated with dynamic data may be associated with a calculation based on the input parameters. Dynamic data involves complex domain data knowledge in the caller side (requesting microservice), which may not be suitable for transferring to other microservice. Dynamic data is time sensitive, as it depends on the time required for performing computations at the receiving side and thus not predictable beforehand. Dynamic data also includes data which is inquired through exchange of information between a requesting and a receiving service, e.g. encryption/authorization calls.

Static Data is associated basically with a change of transitional states in the receiving service side, which can be later accumulated to get a full image of the status of the receiving service, e.g. order creation, warehouse transfer, etc. The static state data may be pushed and stored into a regular DB.

In one embodiment, communication rules in relation to performing different types of data requests between microservices in relation to different type of data may be defined for the application 110. For example, GET requests and POST requests with no side effects to a receiver microservice may be defined to be associated with limited usage to retrieve dynamically generated data when executed through API calling methods. POST/PATCH/PUT/DELETE requests with side effects to a receiver party may be defined to be used without restrictions to a communication method, either API calling or event publishing. Retrieval of state or data (apart from dynamically generated data) from receiver parties may be set to be limited to event-publishing method of service communication.

The application logic 120 is divided into four microservices—microservice "1" 160, microservice "2" 165, microservice "3" 170, and microservice "4" 175. The logic 120 is defined in such manner that there are dependencies between sets of the microservices from the four. For example, microservice "1" 160 is defined to have dependencies with microservice "2" 165 and microservice "4" 175. Microservice "1" 160 communicated with microservice "2" 165 and microservice "4" 175 through direct requests, such as the discussed above HTTP requests, when executing the implemented logic within the microservice "1" 160.

Further, microservice "1" 160 is defined to have a dependency with microservice "3" 165. The communication between microservice "1" 160 and microservice "3" 165 is designed to be accomplished through event-publishing. The event publishing method of communication is executed through a provided event hub 180 at the application logic 120. The event hub 180 stores published event data in relation to microservices that push events with data at the event hub and also stores defined subscriptions for event notifications defined between some of the microservices. For example, microservice "3" 170 pushes events to the event hub 180 in relation to requests from microservice "1" 160, as this is the arranged communication route between these services. Microservice "1" 160 is subscribed to listen to events that are published at the event hub 180 by microservice "3" 170.

The application logic 120 is coupled to a user interface (UI) 130, which is exposed to customers/users of the application 110. For example, user 105 may interact with the UI 140 and define a user request 140. The user request 140 may be associated with executing implemented logic at the application 120, which is related to the microservice "1" 160. Therefore, to provide a result and response to the user 105 based on the user 140, the user request 140 may be evaluated based on the logic implemented at the microservice "1" 160, and also based on logic at the microservice "3" 170, as there is a dependency defined in relation to microservice "1" 160. To execute the user request 140 at the application 110, actions may be performed which evaluate the user request 140 and defined request parameters and/or conditions. The execution of the user request 140 is associated with execution of communication interaction between the microservice "1" 160 and the microservice "3" 170 (as dependent).

In one embodiment, the microservice "1" 160 initially received the user request 140. Relevant data from the request is evaluated to initiate a subsequent request to the microservice "3" 170 in order to provide a result to the user request 140. The communication between microservice "1" 160 and microservice "3" 170 is configured to be performed through event publishing at the event hub. Therefore, the microservice "1" 160 may listen for published events at the event hub from microservice "3" 170. Based on received data at the microservice "1" 160 through the event hub 180, the user request 140 may be served with output result and provided to the user 105.

Figure 2:
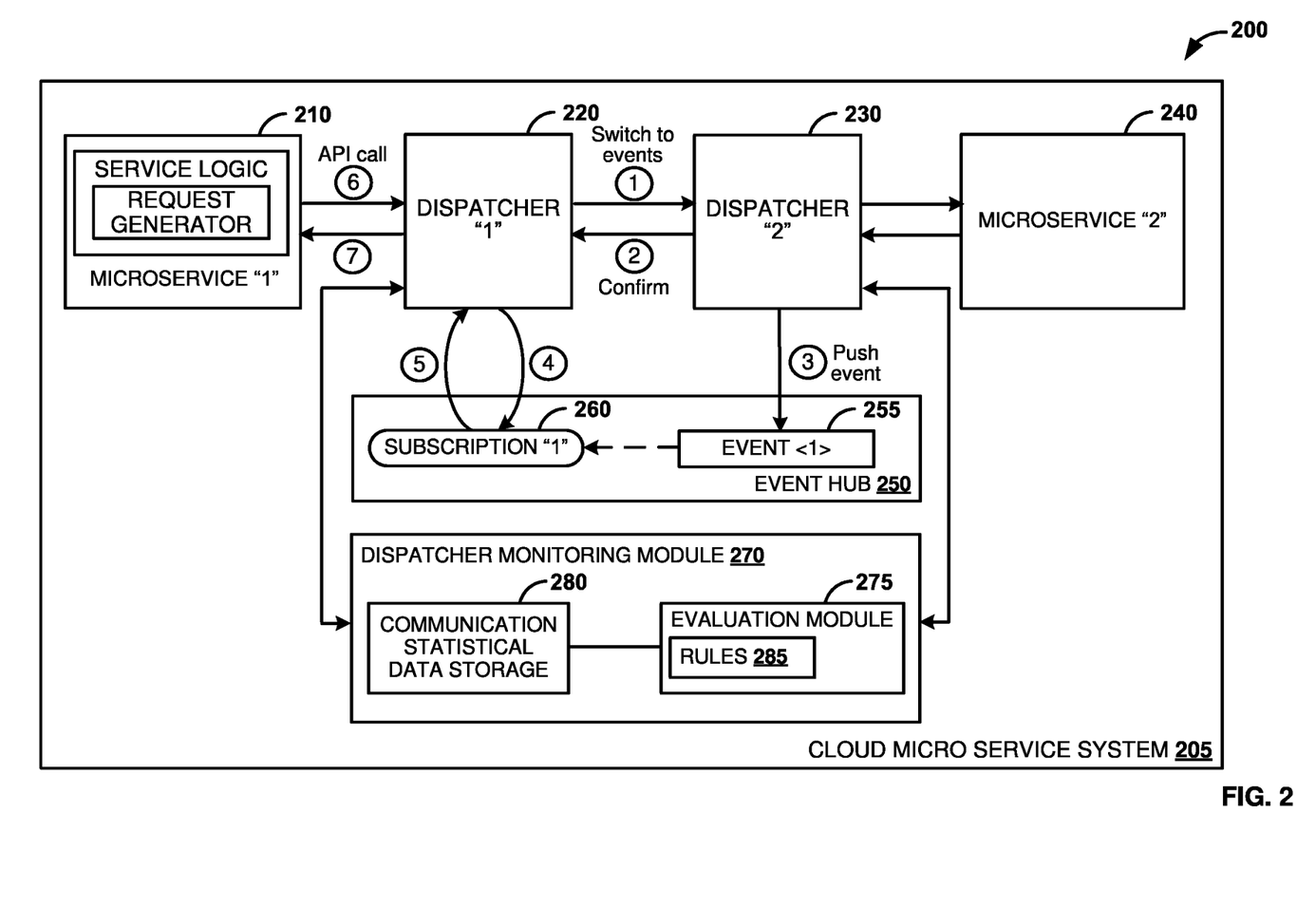
FIG. 2 is a block diagram illustrating an exemplary system for arranging communication between microservices based on evaluation of communication statistical data, according to one embodiment.

FIG. 2 is a block diagram illustrating an exemplary system 200 for arranging communication between microservices based on evaluation of communication statistical data, according to one embodiment. The cloud microservice system 205 is defined to include application logic including two microservices. However, the cloud microservice system 205 may include a different number of microservices defined at different granularity levels.

The cloud microservice system 205 includes a microservice "1" 210 and a microservice "2" 240, which are correspondingly associated with dispatcher "1" 220 and dispatcher "2" 230. Data about the communication and interaction between microservice "1" 210 and microservice "2" is provided to a dispatcher monitoring module 270. The dispatcher monitoring module 270 includes a communication statistical data storage 280, where statistical data about communication between microservices at the cloud microservice system is stored. The communication statistical data is evaluated based on defined logic for evaluation at an evaluation module 275.

In one embodiment, the communication statistical data may be associated with request frequency, receiving side availability, cache data footprint, other. Therefore, the communication statistical data storage includes data in relation to frequency of requests between the microservices, data about timing of responses, about failure of sent requests, about unprocessed requests, about downtime of services, about the size and scale of cached data at the requesting service side, parameters associated with payload size of received responses at the requesting service side, other.

Based on the analysis over the communication statistical data at the evaluation module 275, a different approach for handling communication between different sets of services and different types of requests may be selected. The analysis may be performed in relation to a number of predefined conditions defined at rules 285. The rules 285 may be used to evaluate the stored communication statistical data and to provide further instructions to dispatchers coupled to the microservices for configuring a particular method of communication.

For example, if a frequently requested service API, such as the service API of the microservice "2" 240, is not responsive to the expected level as defined in the rules 285, and/or the cache data size at the microservice "2" 240 meets a predefined qualifying condition criteria, then requests to that API may be determined to be replaced by event listening methods. Based on such determinations, instructions to requesting microservices to the microservice "2", such as the microservice "1", may be sent for configuring an event generation communication between the two. Therefore, the API calls between microservice "1" 210 and microservice "2" 240 may be automatically replaced by event listening methods.

Different types of request associated with state data or with dynamically generated data may be defined to be associated with different communication methods within the predefined condition criteria and associated communication rules. Therefore, the configuration of communication between microservices may be defined on request type level and/or on microservice level. For example, GET requests and POST requests with no side effects to a receiver party may be defined to be associated with limited usage to retrieve dynamically generated data when executed through API calling methods. POST/PATCH/PUT/DELETE requests with side effects to a receiver party may be defined to be used without restrictions to a communication method, either API calling or event publishing. Retrieval of state or data (apart from dynamically generated data) from receiver parties may be set to be limited to event-publishing method of service communication. Therefore, the dispatcher monitoring module 270 may evaluate the communication statistical data and provide instructions to a dispatcher of a microservice to limit usage of certain communication methods with respect to given request types when communicating with another microservice.

In some embodiments, microservices within a software system may be enhanced with dispatcher modules. A dispatcher at a microservice may be provided with a routing logic for performing communication with other microservices based on analysis results over communication statistical data stored at the dispatching monitoring module 240. When certain predefined conditions are fulfilled during the analysis of communication statistical data, event listening may be selected as a replacement to API calling method.

In one embodiment, the dispatcher monitoring module 270 sends instructions to dispatcher "1" 220 of a microservice "1" 210 to initiate a request stating a switch to an event listening mode to a dispatcher "2" 230 of microservice "2". The initiation of such a request can result in replacement of API calling method with event publishing methods for communication between the two microservices. The dispatcher "2" 230 may respond to the request to confirm the switching of communication method. The communication between the two microservices may be handled through an event hub 250, where subscriptions for notifications for published events may be imposed. In such manner, where there is a status change at the receiver service side—microservice "2" 240, the dispatcher "2" 230 may broadcast an event <1>255 including relevant details for the change. The dispatcher "1" 220 may subscribe (define subscription "1" 260) to the event and perform data caching. When the microservice "1" 210 initiates an API call to the microservice "2" 240 based on the application implemented logic at the microservice "1" 210, the microservice "2" receives the API call at the dispatcher "2" 230. The dispatcher "2" of microservice "2" may intercept the request and directly respond. The response may include previously listened data, when the request and the requested data is associated with event listening.

Figure 3:
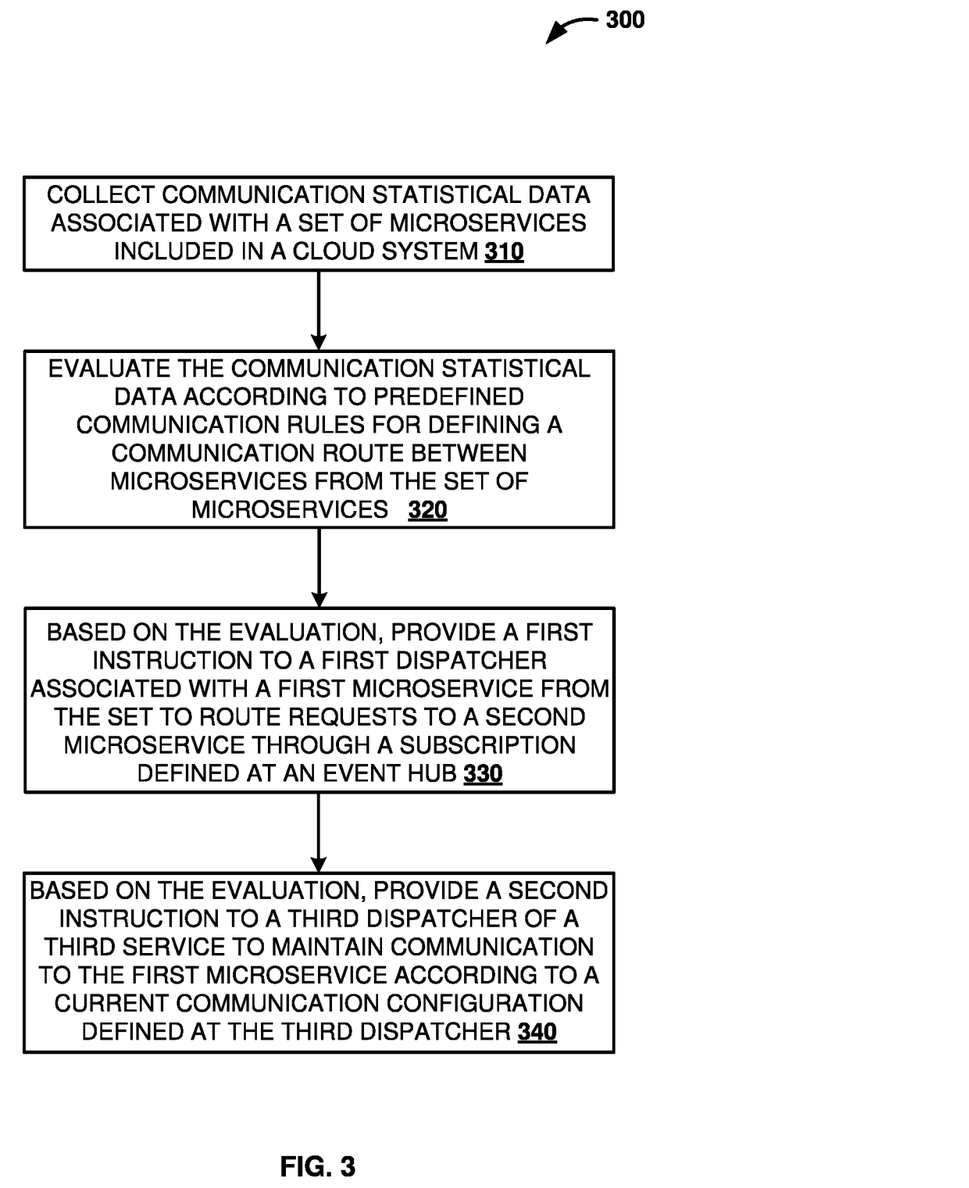
FIG. 3 is a flow diagram illustrating a process for providing instructions to microservices part of a cloud application based on evaluation rules, according to one embodiment.

FIG. 3 is a flow diagram illustrating a process 300 for providing instructions to microservices part of a cloud application based on evaluation rules, according to one embodiment. The process 300 may be implemented in system environments providing cloud infrastructure for running cloud applications.

In one embodiment, a set of microservices is defined within a cloud application. When the cloud application receives requests based on application implemented logic and/or provided functionality through cloud application's user interface (UI), different communication interactions between the microservices are executed. The microservices are associated with interconnecting dependencies, where the operation of one microservice may be dependent on provided data resources from one or more other microservices from the set. The communication between the microservices may be performed through standard API calls.

At 310, communication statistical data associated with a set of microservices included in a cloud system is collected.

At 320, the communication statistical data is evaluated according to predefined communication rules for defining a communication route between microservices from the set of microservices.

At 330, based on the evaluation, a first instruction to a first dispatcher associated with a first microservice from the set is provided. The first instruction defines to route requests from the first microservice to a second microservice through a subscription defined at an event hub. The event hub is instantiated as an event communication layer, where microservices may be subscribed to receiving notifications associated with published events.

At 340, based on the evaluation, a second instruction to a third dispatcher of a third service is provided. The second instruction is for maintaining communication to the first microservice according to a current communication configuration defined at the third dispatcher.

A system split-up into microservices using event-publishing as the communication method can be designed. This is because that for static state dependencies (such as database (DB) data) on other services, event-publishing can fetch relevant data by listening to state change broadcasts sent by others. As for dynamically generated data (such as real-time calculation, encryption requests, etc.), a pair of published events with opposite directions can achieve the data request as a disguised API call. API calls can be achieved by event-publishing methods. A published event may be interpreted as an API call without a response. The two concepts—API calls and event-publishing methods, may be interchangeable in communication terms. The architecture for communication between microservices is defined based on a set of configured communication rules.

Figure 4:
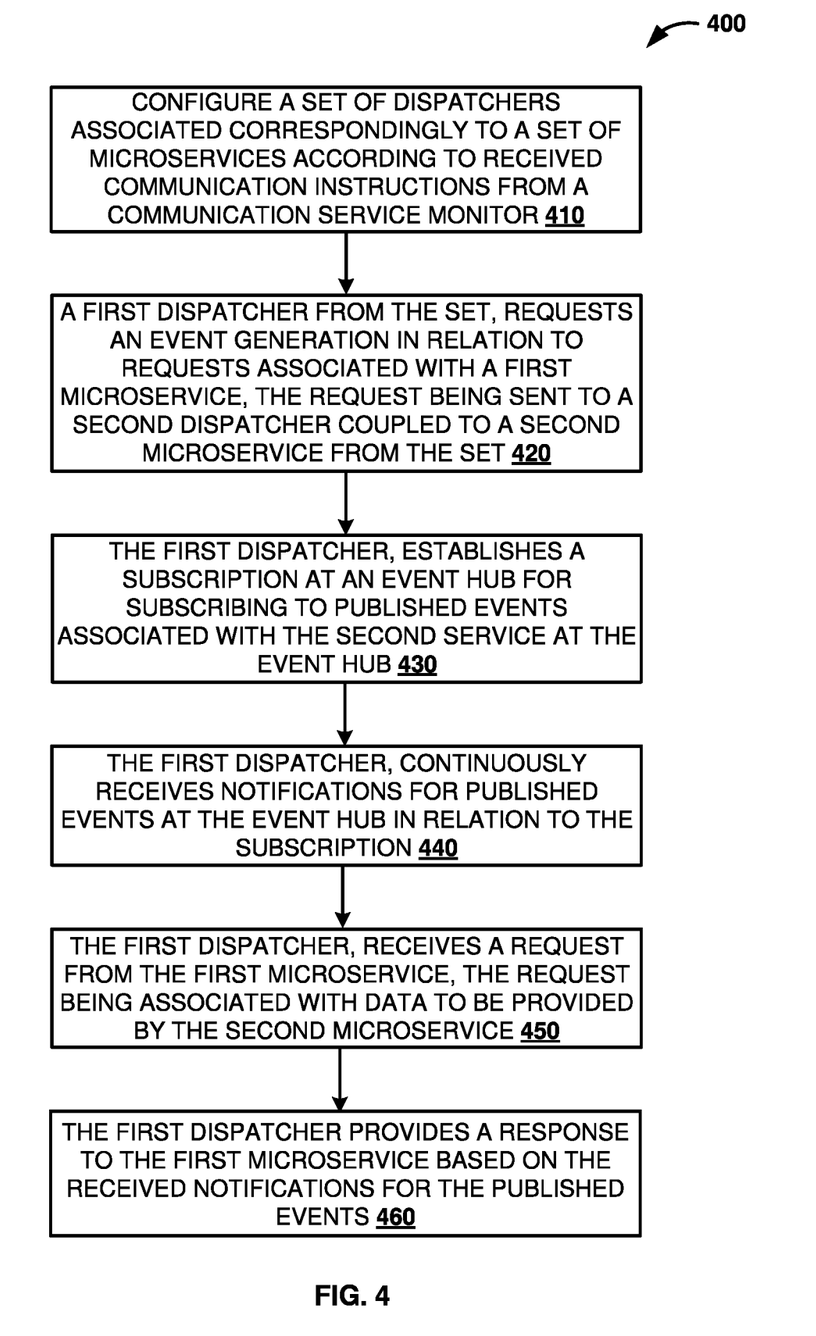
FIG. 4 is a flow diagram illustrating a process for configuring communication methods between a set of microservices at a cloud application, according to one embodiment.

FIG. 4 is a flow diagram illustrating a process 400 for configuring communication methods between a set of microservices at a cloud application, according to one embodiment. In some embodiment, the cloud application may be such as the application 110 described in relation to FIG. 1. The communication between the microservices at the cloud application may be arranged as described in FIG. 1, FIG. 2, and/or combination thereof.

At 410, a set of dispatchers associated correspondingly to the set of microservices are configured according to received communication instructions from a communication service monitor. The set of dispatchers may be instantiated at a dispatcher layer of the cloud application, where at least two of the set of microservices may be configured to communicated through their correspondingly instantiated dispatchers. The microservices may provide instructions to the dispatchers, for example, through API request. The communication between the microservices may be defined according to communication rules, where the default communication method between the microservices may be set to API calling if not overruled by event-publishing communication method configuration.

At 420, a first dispatcher from the set requests an event-publishing configuration in relation to requests associated with a first microservice. The first dispatcher sends the request to a second dispatcher coupled to a second microservice from the set.

The first dispatcher is associated with a first microservice from the set. The cloud application logic may be defined in such manner that requests received by the cloud application are executed based on the logic of the first microservice and one or more other services. For example, there may be a dependency defined between the first microservice and the second microservice. Therefore, to serve different requests received at the first microservice, the first microservices may have to communicate and request data or resources from the second microservice.

In one embodiment, the first dispatcher may request event generation based on received instructions from a dispatcher monitoring module, such as the dispatcher monitoring module 270, FIG. 2. Communication statistical data associated with exchange of requests between microservices may be stored and monitored. The communication statistical data may be associated with request frequency, receiving side availability, cache data footprint, other. Based on the analysis over the communication statistical data, a different approach for handling communication between different sets of services and different types of requests may be selected.

In one embodiment, the first dispatcher may request event generated based on evaluation results over the communication statistical data in relation to communication handling with the second microservice. For example, if the second microservice is frequently requested through the provided service API and it is determined that it is not responsive to the expected level, then requests to that API may be instructed to be replaced by event listening methods. The evaluation of the communication statistical data may be performed at the dispatcher monitoring module, and relevant instructions may be send. As a result of sent instructions from the dispatcher monitoring module, the first dispatcher from the set may request the event generation method in relation to the second microservices.

At 430, the first dispatcher, establishes a subscription at an event hub for subscribing to published events associated with the second service at the event hub. The event hub may be provided as a layer associated with the microservices, where a microservice may publish events and may receive notification for published events for which it is subscribed.

In such manner, the first microservice may communicate with the second service through event-publishing, as that is the communication method that is designed. When there are state dependencies between the two services, event-publishing can fetch relevant data by listening to state change broadcasts sent by the second service through the event hub. Exemplary state dependencies may be for example requests for database (DB) data. As for dynamically generated data (such as real-time calculation data, encryption requests, etc.), a pair of published events at the event hub with opposite directions can achieve a data request from the first service to the second service. The publishing and listening to event based on subscriptions may be interpreted as an alternative to an API calling method achieved through direct API calls between the services without the configuration of dispatchers. In one embodiment, previously defined API calling communication method between services, such as the first and second service, can be replaced with event-publishing methods. A published event may be interpreted as an API call without a response.

In one embodiment, the two communication methods—API calling and event-publishing, may be configured interchangeably in communication terms between services from the set of microservices. The architecture for communication between microservices is defined based on a set of configured communication rules. The configuration communication rules may be defined based on communication between dispatchers associated correspondingly with the services.

At 440, the first dispatcher, continuously receives notifications for published events at the event hub in relation to the subscription for events related to the second service.

At 450, the first dispatcher, receives a request from the first microservice, the request being associated with data to be provided by the second microservice. At 460, the first dispatcher provides a response to the first microservice based on the received notifications for the published events. The provided response is based on continuous listening to published events at the event hub in relation to data provided by microservices for which it is subscribed. The first dispatcher may perform data caching in relation to received notification about subscribed published event. When the first dispatcher is subscribed to an event associated the request from the first microservice, the first dispatcher may search into the data cache and provide a response based on the cache.

Figure 5:
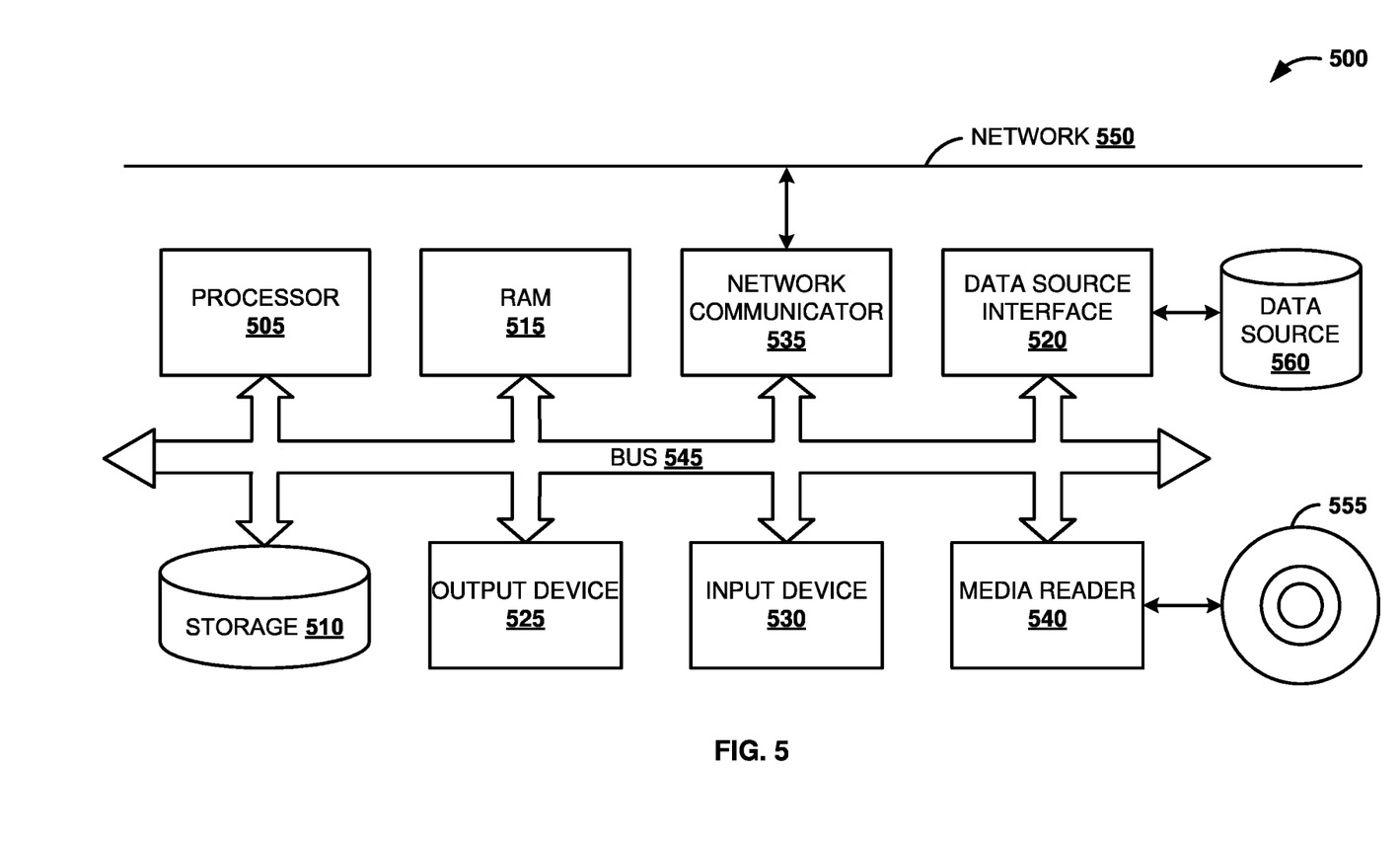
FIG. 5 is a block diagram illustrating an embodiment of a computing environment in which the techniques described for arranging communication between microservices can be implemented.

FIG. 5 is a block diagram illustrating an embodiment of a computing environment in which the techniques described for arranging communication between microservices can be implemented.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter.

For example, an embodiment may be implemented using Java, C++, or other object-oriented programming language and development tools. Another embodiment may be implemented in hard-wired circuitry in place of, or in combination with machine readable software instructions.

FIG. 5 is a block diagram of an exemplary computer system 500. The computer system 500 includes a processor 505 that executes software instructions or code stored on a computer readable storage medium 555 to perform the above-illustrated methods. The processor 505 can include a plurality of cores. The computer system 500 includes a media reader 540 to read the instructions from the computer readable storage medium 555 and store the instructions in storage 510 or in random access memory (RAM) 515. The storage 510 provides a large space for keeping static data where at least some instructions could be stored for later execution. According to some embodiments, such as some in-memory computing system embodiments, the RAM 515 can have sufficient storage capacity to store much of the data required for processing in the RAM 515 instead of in the storage 510. In some embodiments, all of the data required for processing may be stored in the RAM 515. The stored instructions may be further compiled to generate other representations of the instructions and dynamically stored in the RAM 515. The processor 505 reads instructions from the RAM 515 and performs actions as instructed. According to one embodiment, the computer system 500 further includes an output device 525 (e.g., a display) to provide at least some of the results of the execution as output including, but not limited to, visual information to users and an input device 530 to provide a user or another device with means for entering data and/or otherwise interact with the computer system 500. Each of these output devices 525 and input devices 530 could be joined by one or more additional peripherals to further expand the capabilities of the computer system 500. A network communicator 535 may be provided to connect the computer system 500 to a network 550 and in turn to other devices connected to the network 550 including other clients, servers, data stores, and interfaces, for instance. The modules of the computer system 500 are interconnected via a bus 545. Computer system 500 includes a data source interface 520 to access data source 560. The data source 560 can be accessed via one or more abstraction layers implemented in hardware or software. For example, the data source 560 may be accessed by network 550. In some embodiments the data source 560 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments.

One skilled in the relevant art will recognize, however that the embodiments can be practiced without one or more of the specific details or with other methods, components, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to handle communication between microservices, the method comprising:
   instantiating a dispatcher layer including a set of dispatchers correspondingly associated with a set of microservices part of an application;
   evaluating communication statistical data for the set of microservices based on predefined communication conditions related to determining a communication method for interaction between a first microservice and a second microservice from the set of microservices; and
   based on the evaluation, providing instructions to a first dispatcher at the dispatcher layer for configuring the determined communication method between the first microservice and the second microservice, wherein the first dispatcher is coupled to the first microservice, and wherein the first dispatcher configures the communication method based on an interaction with a second dispatcher associated with the second microservice, the configuring of the communication method by the first dispatcher comprising replacing an API call from the first microservice for the second microservice with an event generation communication.

2. The method of claim 1, further comprising:
   collecting the communication statistical data in relation to the set of microservices of the application at a dispatcher monitoring system.

3. The method of claim 1, wherein the evaluation of the communication statistical data is performed at a communication service monitor.

4. The method of claim 3, wherein the communication service monitor provides evaluation results based on analysis over the communication statistical data stored in relation to the set of microservices and based predefined communication conditions.

5. The method of claim 3, wherein the determining of the communication method for the interaction between the first microservice and the second microservice is associated with a type of requests sent from the first microservice and the second service, wherein the type of requests is mapped to a defined communication method.

6. The method of claim 3, wherein the predefined communication conditions include a mapping of a communication criteria with a method of communication, wherein the communication criteria is associated with a threshold value for evaluation of parameters computed based on the communication statistical data.

7. The method of claim 1, further comprising:
   configuring the set of dispatchers correspondingly related to set of microservices part according to communication methods defined with received configuration instructions at the dispatcher layer.

8. The method of claim 7, wherein configuring is performed based on received communication instructions from a communication service monitor, wherein a communication instruction defines a communication method between a pair of microservices.

9. The method of claim 7, further comprising:
   based on the evaluation of the communication statistical data, providing a first instruction to the first dispatcher from the set to route requests to the second microservice through a subscription defined at an event hub; and
   based on the evaluation of the communication statistical data, providing a second instruction to a third dispatcher of a third microservice to maintain communication to the first microservice according to a current communication configuration defined at the third dispatcher.

10. The method of claim 7, further comprising:
    providing an event hub for subscribing for event notifications and publishing events by the set of microservices through the set of dispatchers.

11. The method of claim 7, further comprising:
    a first dispatcher of the set, requesting an event-publishing configuration in relation to requests associated with the first microservice of the set from the second dispatcher coupled to the second microservice of the set; and
    the first dispatcher provides a response to the first microservice based on received notifications for published events in relation to the second microservice.

12. The method of claim 9, further comprising:
    the first dispatcher, establishing a subscription at an event hub to published events associated with the second microservice;
    the first dispatcher, continuously receiving notifications for published events at the event hub in relation to the subscription; and
    the first dispatcher, receiving a request from the first microservice, the request being associated with data to be provided by the second microservice.

13. A computer system to handle communication between microservices, comprising:
    a processor;
    a memory in association with the processor storing instructions related to:
      instantiating a dispatcher layer including a set of dispatcher correspondingly associated with a set of microservices part of an application;
      evaluating communication statistical data for the set of microservices based on predefined communication conditions related to determining a communication method for interaction between a first microservice and a second microservice from the set of microservices; and based on the evaluation, providing instructions to a first dispatcher at the dispatcher layer for configuring the determined communication method between the first microservice and the second microservice, wherein the first dispatcher is coupled to the first microservice, and wherein the first dispatcher configures the communication method based on an interaction with a second dispatcher associated with the second microservice, the configuring of the communication method comprising replacing an API call from the first microservice for the second microservice with an event generation communication.

14. The system of claim 13, further comprises instructions related to:

collecting the communication statistical data in relation to the set of microservices of the application at a dispatcher monitoring system;

configuring the set of dispatchers correspondingly related to set of microservices part according to communication methods defined with received configuration instructions at the dispatcher layer;

providing an event hub for subscribing for event notifications and publishing events by the set of microservices through the set of dispatchers;

based on the evaluation of the communication statistical data, providing a first instruction to the first dispatcher from the set to route requests to the second microservice through a subscription defined at the event hub; and based on the evaluation of the communication statistical data, providing a second instruction to a third dispatcher of a third microservice to maintain communication to the first microservice according to a current communication configuration defined at the third dispatcher.

15. The system of claim 13, wherein the evaluation of the communication statistical data is performed at a communication service monitor, wherein the communication service monitor provides evaluation results based on analysis over the communication statistical data stored in relation to the set of microservices and based predefined communication conditions.

16. The system of claim 13, wherein the determining of the communication method for the interaction between the first microservice and the second microservice is associated with a type of requests sent from the first microservice and the second microservice, wherein the type of requests is mapped to a defined communication method.

17. The method of claim 13, wherein the predefined communication conditions include a mapping of a communication criteria with a method of communication, wherein the communication criteria is associated with a threshold value for evaluation of parameters computed based on the communication statistical data.

18. A non-transitory computer-readable medium storing instructions, which when executed cause a computer system to:

instantiate a dispatcher layer including a set of dispatcher correspondingly associated with a set of microservices part of an application;

evaluate communication statistical data for the set of microservices based on predefined communication conditions related to determining a communication method for interaction between a first microservice and a second microservice from the set of microservices; and based on the evaluation, provide instructions to a first dispatcher at the dispatcher layer for configuring the determined communication method between the first microservice and the second microservice, wherein the first dispatcher is coupled to the first microservice, and wherein the first dispatcher configures the communication method based on an interaction with a second dispatcher associated with the second microservice, the configuring of the communication method comprising replacing an API call from the first microservice for the second microservice with an event generation communication.

19. The computer-readable medium of claim 18, further comprises instructions to:

collect the communication statistical data in relation to the set of microservices of the application at a dispatcher monitoring system;

configure the set of dispatchers correspondingly related to set of microservices part according to communication methods defined with received configuration instructions at the dispatcher layer;

provide an event hub for subscribing for event notifications and publishing events by the set of microservices through the set of dispatchers;

based on the evaluation of the communication statistical data, provide a first instruction to the first dispatcher from the set to route requests to the second microservice through a subscription defined at the event hub; and based on the evaluation of the communication statistical data, provide a second instruction to a third dispatcher of a third microservice to maintain communication to the first microservice according to a current communication configuration defined at the third dispatcher.

20. The computer-readable medium of claim 18, wherein the determining of the communication method for the interaction between the first microservice and the second microservice is associated with a type of requests sent from the first microservice and the second microservice, wherein the type of requests is mapped to a defined communication method.

* * * * *